United States Patent [19]

Sekiguchi et al.

[11] Patent Number: 5,154,975
[45] Date of Patent: Oct. 13, 1992

[54] LIQUID COMPOSITION FOR GLASS FIBER IMPREGNATION

[75] Inventors: Masato Sekiguchi, Mie; Akinobu Okamura, Tsu, both of Japan

[73] Assignee: Nippon Glass Fiber Co., Ltd., Mie, Japan

[21] Appl. No.: 714,376

[22] Filed: Jun. 10, 1991

Related U.S. Application Data

[60] Division of Ser. No. 593,542, Oct. 1, 1990, abandoned, which is a continuation of Ser. No. 239,744, Sep. 2, 1988, abandoned.

[30] Foreign Application Priority Data

Sep. 7, 1987 [JP] Japan ................................ 62-222006

[51] Int. Cl.⁵ ..................... B32B 17/02; B32B 17/04; D02G 3/6
[52] U.S. Cl. ................................. 428/388; 57/258; 428/294; 428/295; 524/510
[58] Field of Search ........................ 428/388; 57/258

[56] References Cited

U.S. PATENT DOCUMENTS 4,255,486 3/1981 Burke .................................. 428/356
4,405,746 9/1983 Girgis .................................. 524/501

OTHER PUBLICATIONS

Chem. Abst., vol. 103 (1985): 10C101.

Primary Examiner—James C. Cannon
Attorney, Agent, or Firm—Wenderoth, Lind & Ponack

[57] ABSTRACT

A liquid composition for glass fiber impregnation, characterized in that (A) it comprises (1) a resorcinol-formaldehyde resin, (2) a butadiene/styrene/vinylpyridine terpolymer, and (3) chlorosulfonated polyethylene, and (B) based on the total solids of the components (1), (2) and (3), the proportion of component (1) is 2 to 15% by weight, the proportion of component (2) is 15 to 80% by weight, and the proportion of component (3) is 15 to 70% by weight; and a glass fiber cord having a solid coating derived from the liquid composition. The glass fiber cord is useful as a reinforcing material in products, such as timing belts, which undergo both heat and an external force during travelling.

3 Claims, 2 Drawing Sheets

LIQUID COMPOSITION FOR GLASS FIBER IMPREGNATION

This is a rule 60 divisional of Ser. No. 07/593,542, filed Oct. 1, 1990, now abandoned, which is a continuation of now abandoned Ser. No. 07/239,744, filed Sep. 2, 1988.

This invention relates to a liquid composition for glass fiber impregnation, and a glass fiber cord having a coating derived from the composition. More specifically, it relates to a liquid composition suitable as an impregnant for glass fiber cords used as a reinforcing material in products, such as timing belts, which undergo both heat and an external force during travelling.

Usually, glass fiber cords as cores (reinforcement) of timing belts are treated with a resorcinol-foamalin latex (RFL) before they are embedded in a substrate rubber.

Japanese Laid-Open Patent Publication No. 3184/1975 discloses a glass fiber impregnant comprising 2 to 10 parts by weight of a resorcinol-aldehyde resin, 20 to 60 parts by weight of a butadiene/styrene/vinylpyridine terpolymer, 15 to 40 parts by weight of a carboxylated butadiene styrene resin and 3 to 30 parts by weight of an incompatible wax (such as a paraffin wax).

Japanese Laid-Open Patent Publication No. 53780/1984 discloses a surface-treating agent for fibers comprising an aqueous solution of a resorcinol-formaldehyde resin, an aqueous dispersion of a sulfohalogenated polymer and a zinc compound or a magnesium compound.

Japanese Laid-Open Patent Publication No. 73453/1984 discloses reinforcing glass fibers treated with the surface-treating agent described in the above-cited Japanese Laid-Open Patent Publication No. 53780/1984.

Japanese Laid-Open Patent Publication No. 207442/1986 discloses a method of bonding fibers treated with a mixture of a latex of a halogen-containing polymer such as chlorosulfonated polyethylene and resorcinol-formaldehyde to a nitrile group-containing saturated hydrocarbon rubber compound, involving vulcanization.

Japanese Patent Publication No. 37513/1972 discloses a latex of an impregnant containing an elastomer, which is for the purpose of improving adhesion to the substrate rubber, flexibility, thermal resistance or water resistance.

Japanese Laid-Open Patent Publication No. 70196/1978 discloses an impregnant for glass fiber tire cords comprising a butadiene/half ester/methacrylic acid terpolymer, an emulsifiable mineral oil, a silica derivative and an ester.

Japanese Laid-Open Patent Publication No. 69192/1979 discloses an impregnating agent for glass fiber tire cords comprising a vinylpyridine terpolymer, a polybutadiene latex, a wax emulsion and a resorcinol/formaldehyde resin.

It is an object of this invention to provide a novel liquid composition for impregnating glass fibers.

Another object of this invention is to provide a novel glass fiber impregnating composition comprising chlorosulfonated polyethylene as one rubber component.

Still another object of this invention is to provide a glass fiber cord impregnating composition which can impart excellent thermal resistance, flexural fatigue resistance and flexibility to products containing glass fiber cords, and also a glass fiber cord treated with the composition.

Yet another object of this invention is to provide a glass fiber impregnating composition which can be applied to products simultaneously undergoing heat and an external force, such as a timing belt, to retain the strength of the products over an extended period of time, and also a glass fiber cord treated with the composition.

Further objects of this invention along with its advantages will become apparent from the following description.

According to this invention, the above objects and advantages of this invention are achieved by a liquid composition for glass fiber impregnation, characterized in that (A) it comprises (1) a resorcinol-formaldehyde resin, (2) a butadiene/styrene/vinylpyridine terpolymer, and (3) chlorosulfonated polyethylene, and (B) based on the total solids of the components (1), (2) and (3), the proportion of component (1) is 2 to 15 % by weight, the proportion of component (2) is 15 to 80 % by weight, and the proportion of component (3) is 15 to 70 % by weight.

The present invention will now be described in detail partly with reference to the accompanying drawings in which.

Figure 1:
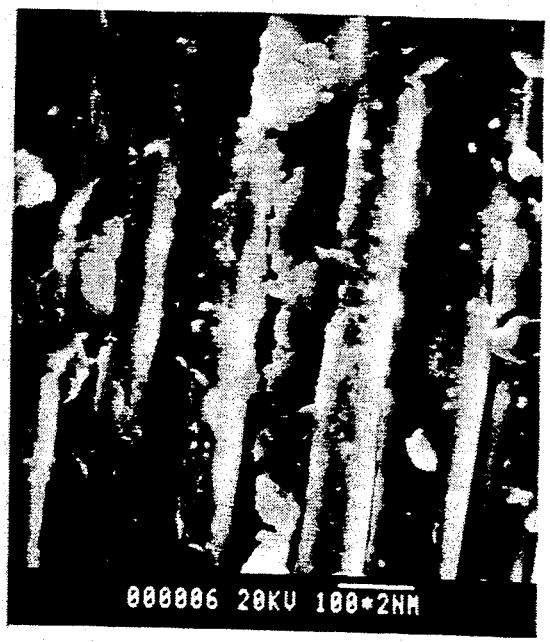
FIG. 1 is an electron micrograph showing the state of the impregnating composition of this invention in the cords of the timing belt obtained in Example 1 after it was subjected to a travelling test.

The liquid composition of this invention for glass fiber impregnation is characterized by comprising the components (1), (2) and (3) as essential ingredients.

In a preferred embodiment of the liquid composition of this invention, a dicarboxylated butadiene/styrene resin (4) or chloroprene rubber (5) is used place of part of the termpolymer (2).

The resorcinol/formaldehyde resin (1) is preferably a resin formed by condensation reaction between resorcinol and formaldehyde in a mole ratio of 1:1-3. It may be, for example, a resin known as a resol-type resin or a novolak-type resin. The resin (1) can be used suitably, for example as an aqueous solution having a solids content of 8 % by weight.

The butadiene/styrene/vinylpyridine terpolymer as component (2) may be any of many terpolymers of this type known to those skilled in the art. For example, there may be used a terpolymer derived from 20 to 85 % by weight of butadiene, 5 to 70 % by weight of styrene and 5 to 30 % by weight of vinylpyridine and a terpolymer derived from about 70 % by weight of butadiene, about 15 % by weight of styrene and about 15 % by weight of vinylpyridine.

Typical suitable butadiene/styrene/vinylpyridine terpolymers include a terpolymer available from Nippon Zeon Co., Ltd. under the trademark "Nipol 2518FS", a terpolymer available from Japan Synthetic Rubber Co., Ltd. under the trademark "JSR0650" and a terpolymer available from Sumitomo-Naugatuck Co., Ltd. under the trademark "Pyratex J-1904". The terpolymer (2) may be used suitably as a latex having a solids content of, for example, about 40 % by weight.

Chlorosulfonated polyethylene as component (3) is produced by chlorinating polyethylene in the presence of sulfur dioxide, and some of the hydrogen atoms of the main chain of the polyethylene are replaced by a chlorosulfonyl group ($ClSO_2$—) and chlorine. Preferably, the chlorosulfonated polyethylene used in this invention has a chlorine content of 25 to 43 % by weight and a sulfur content of 1.0 to 1.5 % by weight. The chlorosulfonated polyethylene as component (3) can be used suitably as a latex having a solids content of 30 to 60 % by weight, for example 40 % by weight. A typical suitable chlorosulfonated polyethylene can be obtained, for example, from Sumitomo Chemical Co., Ltd. under the tradename "Esprene".

The dicarboxylated butadiene/styrene resin as component (4) used in the preferred composition of this invention can be produced, for example, by copolymerizing butadiene and styrene in the presence of a small amount of an ethylenically unsaturated dicarboxylic acid such as maleic acid. For example, a dicarboxylated butadiene/styrene resin containing 20 to 80 % by weight of butadiene, 5 to 70 % of ethylene and 1 to 10 % by weight of the ethylenically unsaturated dicarboxylic acid can be advantageously used.

The carboxylated butadiene/styrene resin (4) is suitably used as a latex having a solids content of, for example, 30 to 60 % by weight, for example 40 % by weight. Typical suitable dicarboxylated butadiene/styrene resins are available from Nippon Zeon Co., Ltd. under the trademark "Nipol 2570X5" and from Japan Synthetic Rubber Co., Ltd. under the trademark "JSR 0668, JSR 0691 or JSR 0697".

The chloroprene rubber as component (5) used in the preferred composition of this invention may be any of many rubbers of this type known to those skilled in the art. It may be used suitably as a latex having a solids content of, for example, 30 to 60 % by weight, for example 60 % by weight. Typical suitable chloroprene rubbers are available from Showa Neoprene Co., Ltd. under the trademark "Neoprene 650" and from Bayer AG under the trademark "Baypren Latex".

The latices of components (2) to (5) may contain emulsifiers known to those skilled in the art.

The liquid composition of this invention for glass fiber impregnation comprises 2 to 15 % by weight of component (1), 15 to 80 % by weight of component (2) and 15 to 70 % by weight of component (3) based on the total solids content of the three components.

Preferably, the proportions of components (1), (2) and (3) are 5 to 10 % by weight, 35 to 65 % by weight and 20 to 50 % by weight, respectively. The above-specified proportions of the three components are important in achieving the objects of this invention.

Component (4) or (5) in the preferred composition of this invention may replace 10 to 90 % of the weight of component (2) within the above weight range of component (2).

As required, a base for pH adjustment, such as ammonia, and an antioxidant may be incorporated in the liquid composition of this invention.

The liquid composition of this invention for glass fiber impregnation may suitably be used as an aqueous latex having a solids content of usually 15 to 30 % by weight. The liquid composition of the invention is applied to glass fiber strands by immersing them in the composition, removing the excess of the composition, and then as required, drying the glass strands. The glass fiber strands used may or may not contain a sizing agent applied at the time of fiber forming. The desired number of the glass fiber strands are gathered and usually twisted to give a glass fiber cord. The glass fiber cord is embedded in an uncured rubber substrate by a method known per se, and heated under pressure to perform vulcanization.

In the above method, the liquid composition of this invention is applied in an amount of usually 10 to 30 % by weight, as the solids content, based on the glass fiber cord, to give a coating of the liquid composition to the glass fiber cord.

The coating of the liquid composition usually undergoes heat-treatment before the glass fiber cord is embedded in the rubber substrate and becomes a solid coating. Preferably, the amount of the solid coating is 10 to 20 % by weight, as solids, of the glass fibers.

The glass fiber cord having the impregnating liquid composition applied to it shows excellent adhesion to various rubbers, particularly to chloroprene rubber, hydrated nitrile rubber and chlorosulfonated polyethylene. With the rise in temperature near automobile engines, not only chloroprene used heretofore but also heat-resistant rubbers such as chlorosulfonated polyethylene and hydrogenated nitrile rubber have recently come into use as rubbers for production of timing belts of automobiles. The impregnating liquid composition of the invention is characteristic in that it also has sufficient adhesion to these heat-resistant rubbers. The glass fiber cord to which the impregnating composition of this invention has been applied is preferably further treated with a treating liquor comprising a halogen-containing polymer and an isocyanate compound before it is embbeded in the rubber substrate if the rubber is hydrogenated nitrile rubber or chlorosulfonated polyethylene. This further treatment enhances adhesion.

The resulting rubber product has superior thermal resistance, flexural fatigue resistance and flexibility. Accordingly, the impregnating liquid composition provided by this invention can be very suitably used for impregnation of glass fiber cords used, for example, in timing belts which simultaneously undergo heat and an external force.

The following examples illustrate the present invention in greater detail. All parts in these examples are by weight.

EXAMPLE 1

(1) Alkali-free glass was spun to form filaments having a diameter of 9 micrometers. The filaments were bundled by using a sizing agent to give glass strands having a size of 33.7 tex. Three glass strands were plied and immersed in, and passed through, an impregnant having the following composition.

| Composition of the impregnant | |
| --- | --- |
| Resorcinol-formaldehyde resin latex (solids content 8% by weight) | 30 parts |
| Butadidne/styrene/vinylpyridine | 45 parts |

| Composition of the impregnant | |
|---|---|
| terpolymer latex (solids content 40% by weight; JSR 0650) | |
| Chlorosulfonated polyethylene latex (solids content 40% by weight; Esprene L-450) | 20 parts |
| 25% Aqueous ammonia | 1 part |
| Water | 4 parts |

The excess of the impregnant was then removed until its solids content became 20 % by weight based on the glass cord. The coated glass strands were further heat-treated at 250° C. for 2 minutes to give an impregnant-treated glass fiber bundle. The glass fiber bundle was given a primary twist 12.1 times per inch in the Z direction (S direction).

(2) Thirty such first-twisted glass fiber bundles were given a secondary twist 2.1 times per inch in the S direction (Z direction) to give a cord [ECG150 3/13 2.11S(Z))]. The cord was cut to pieces having a length of 120 mm. A sheet of uncured chloroprene rubber having the formulation shown in Table 1 was prepared, and 20 such cord pieces were aligned parallel to each other (total width 25 mm) on the chloroprene rubber sheet. The assembly was pressed both from top and below at 150° C. for 25 minutes to effect curing.

TABLE 1

| Rubber compounding | |
|---|---|
| Compounding chemicals | Parts |
| Chloroprene | 100 |
| Magnesium oxide | 4 |
| Oil | 15 |
| Vulcanization accelerator | 1.5 |
| Carbon black | 60 |
| Zinc flower | 5 |
| Sulfur | 1.0 |
| Stearic acid | 2.5 |

After curing, the end portion of the cord and the end portion of the rubber were firmly grasped and pulled apart in opposite directions to each other to peel the cords from the rubber. The adhesion of the cord to the rubber was thus examined, and was evaluated on the following standards.

⊚: the rubber was fractured
○: more than ¾ of the rubber was fractured
Δ: more than ½ of the rubber was fractured
X: the rubber was not fractured The adhesion strength was the greatest with ⊚, and decreased in the order of ○, Δ and X.

A nylon canvas was-wound up on a cylindrical drum, and the S-twisted treated cord and the Z-twisted treated cord were wound up alternately onto the canvas. Furthermore, an uncured sheet of the rubber compound shown in Table 1 was laminated to it. The entire assembly was subjected to a curing treatment under the same conditions as described above. The cylindrical product was cut to a width of an inch to produce a timing belt. The timing belt was mounted between two pulleys with a diameter of 10 cm, and caused to travel for 300 hours in an atmosphere kept at 80° C. The belt was then cut along the cords, and the state of the cords was observed under an electron microscope, and the state of the impregnant (RFL) was evaluated on the following standard (see FIG. 1).

⊚: No change from the state before travelling
○: RFL became hard and started to undergo cohesive fracture.
Δ: The cohesive fracture proceeded and RFL was crushed into stone-like pieces.
X: The cohesive fracture proceeded further and RFL became sand-like.

The strength retention of the belt after travelling was examined by the following procedure.

The timing belt was mounted on a tensile tester equipped with a pulley at an upper and a lower clamp and pulled, and the strength of the timing belt at breakage was measured. The strength retention (%) of the timing belt after the travelling test was calculated in accordance with the following equation.

$$\text{Strength retention (\%)} = \frac{\text{Tensile strength of the timing belt after travelling}}{\text{Tensile strength of the timing belt before travelling}} \times 100$$

The results are shown in Table 3.

EXAMPLE 2

| | |
|---|---|
| Resorcinol-formaldehyde resin latex (solids content 8% by weight) | 30 parts |
| Butadiene/styrene/vinylpyridine terpolymer latex (solids content 40% by weight; JSR 0650) | 30 parts |
| Chlorosulfonated polyethylene latex (solids content 40% by weight; Esprene L-450) | 20 parts |
| Dicarboxylated butadiene/styrene resin latex (solids content 40% by weight; Nipol 2570X5) | 15 parts |
| 25% Aqueous ammonia | 1 part |
| Water | 4 parts |

The same treatment as in Example 1 was carried out using an impregnant having the above formulation. The results are shown in Table 3.

EXAMPLE 3

| | |
|---|---|
| Resorcinol-formaldehyde resin latex (solids content 8% by weight) | 30 parts |
| Butadiene/styrene/vinylpyridine terpolymer latex (solids content 40% by weight; JSR 0650) | 23 parts |
| Chlorosulfonated polyethylene latex (solids content 40% by weight; Esprene L-450) | 30 parts |
| Dicarboxylated butadiene/styrene resin latex (solids content 40% by weight; Nipol 2570X5) | 12 parts |
| 25% Aqueous ammonia | 1 part |
| Water | 4 parts |

The same treatment as in Example 1 was carried out using an impregnant having the above formulation. The results are shown in Table 3.

EXAMPLE 4

| | |
|---|---|
| Resorcinol-formaldehyde resin latex (solids content 8% by weight) | 30 parts |
| Butadiene/styrene/vinylpyridine terpolymer latex (slids content 40% by weight; JSR 0650) | 30 parts |
| Chlorosulfonated polyethylene | 20 parts |

| | |
|---|---|
| latex (solids content 40% by weight; Esprene L-450) | |
| Chloroprene latex (solids content 60% by weight; Neoprene 650) | 10 parts |
| 25% Aqueous ammonia | 1 part |
| Water | 9 parts |

The same treatment as in Example 1 was carried out using an impregnant having the above formulation. The results are shown in Table 3.

EXAMPLE 5

A treating liquor of the following formulation was coated on the cords [ECG150 3/13 2.1S(Z)] obtained in Example 2 so that the pick-up of the non-volatile materials was 2.6 to 3.5% by weight. The organic solvent was evaporated and removed to give glass fiber cords having a secondary coated layer.

| | |
|---|---|
| Chlorosulfonated polyethylene (TS-340, a product of TOSO Co., Ltd.) | 5.25 parts |
| Methylenebis(4-phenylisocyanate) | 4.5 parts |
| p-Dinitrosobenzene | 2.25 parts |
| Carbon black | 3.0 parts |
| Xylene | 51.0 parts |
| Trichloroethylene | 34.0 parts |

A timing belt was prepared and tested as in Example 1 except that the resulting glass fiber cords and an uncured hydrogenated nitrile rubber sheet having the compounding recipe shown in Table 2 were used, and the atmospheric temperature of the timing belt travelling test was changed to 120° C. The results are shown in Table 3.

TABLE 2

| Compounding chemicals | Parts |
|---|---|
| Hydrogenated nitrile rubber (Zetpo 12020, a product of Nippon Zeon Co., Ltd.) | 100 |
| Zinc oxide | 6 |
| Stearic acid | 1 |
| Carbon black | 40 |
| Thiokol TP-85 | 5 |
| Sulfur | 0.5 |
| Tetramethylthiuram disulfide | 1.5 |
| Cyclohexyl-benzothiazyl | 1.0 |

COMPARATIVE EXAMPLE 1

| | |
|---|---|
| Resorcinol-formaldehyde resin latex (solids content 8% by weight) | 30 parts |
| Butadiene/styrene/vinylpyridine terpolymer latex (solids content 40% by weight; JSR 0650) | 30 parts |
| Dicarboxylated butadiene/styrene resin latex (solids content 40% by weight; Nipol 2570X5) | 35 parts |
| 25% Aqueous ammonia | 1 part |
| Water | 4 parts |

The same treatment as in Example 1 was carried out using an impregnant having the above formulation. The results are shown in Table 3.

| | |
|---|---|
| Resorcinol-formaldehyde resin latex (solids content 8% by weight) | 30 parts |
| Chlorosulfonated polyethylene latex (solids content 40% by weight; Esprene L-450) | 65 parts |
| 25% Aqueous amonia | 1 part |
| Water | 4 parts |

The same treatment as in Example 1 was carried out using an impregnant having the above formulation. The results are shown in Table 3.

COMPARATIVE EXAMPLE 3

Example 5 was repeated except that the glass fiber cords obtained in Comparative Example 1 were used. The results are shown in Table 3.

TABLE 3

Figure 2:
FIG. 2 is an electron micrograph showing the state of the impregnating composition of this invention in the cords of the timing belt obtained in Example 2 after it was subjected to a travelling test.
Figure 3:
FIG. 3 is an electron micrograph showing the state of a comparative impregnating composition in the cords of the timing belt obtained in Comparative Example 1 after it was subjected to a travelling test.
Figure 4:
FIG. 4 is an electron micrograph showing the state of a comparative impregnating composition in the cords of the timing belt obtained in Comparative Example 2 after it was subjected to a travelling test.

| | Example | | | | | Comparative Example | | |
|---|---|---|---|---|---|---|---|---|
| | 1 | 2 | 3 | 4 | 5 | 1 | 2 | 3 |
| Adhesion | ○ | ⊚ | ⊚ | ○ | ○ | ⊚ | X | ○ |
| State of RFL | ○ (FIG. 1) | ⊚ (FIG. 2) | ○ | ○ | ⊚ | Δ (FIG. 3) | X (FIG. 4) | Δ |
| Strength retention of the belt (%) | 75 | 85 | 80 | 70 | 88 | 65 | 45 | 70 |

We claim:

1. A glass fiber cord having a coating comprising an aqueous latex composition, said composition
   (A) consisting essentially of (1) a resorcinol-formaldehyde resin, (2) a butadiene/styrene/vinylpyridine terpolymer, and (3) chlorosulfonated polyethylene, and
   (B) based on the total solids of the components (1), (2) and (3), the proportion of component (1) is 2 to 15% by weight, the proportion of component (2) is 15 to 80% by weight, and the proportion of component (3) is 15 to 70% by weight.

2. A glass fiber cord having a solid coating derived form the liquid composition of claim 1.

3. The glass fiber cord of claim 2 in which the amount of the solid coating is 10 to 30% by weight, as solids, based on the glass fiber.

* * * * *